United States Patent
Shu

(10) Patent No.: US 12,411,564 B2
(45) Date of Patent: Sep. 9, 2025

(54) TOUCH RECOGNITION METHOD AND SYSTEM FOR CONJOINED SIDE BUTTON, AND RELATED DEVICE

(71) Applicant: AAC Acoustic Technologies (Shanghai) Co., Ltd., Shanghai (CN)

(72) Inventor: Chengxiang Shu, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/774,940

(22) Filed: Jul. 17, 2024

(65) Prior Publication Data

US 2025/0216958 A1 Jul. 3, 2025

Related U.S. Application Data

(63) Continuation of application No. PCT/CN2023/143461, filed on Dec. 29, 2023.

(51) Int. Cl.
G06F 3/0354 (2013.01)
G06F 3/02 (2006.01)

(52) U.S. Cl.
CPC ........ G06F 3/03547 (2013.01); G06F 3/0202 (2013.01)

(58) Field of Classification Search
CPC .................. G06F 3/03547; G06F 3/0202
See application file for complete search history.

(56) References Cited

U.S. PATENT DOCUMENTS

| | | | |
|---|---|---|---|
| 10,698,489 B1* | 6/2020 | Beyhs | G06F 3/016 |
| 2014/0218330 A1* | 8/2014 | Ady | H03K 17/962 |
| | | | 345/174 |
| 2018/0341347 A1* | 11/2018 | Yousefpor | G06F 3/043 |
| 2018/0356891 A1* | 12/2018 | Murakami | G06F 3/041 |
| 2020/0103968 A1* | 4/2020 | Amin-Shahidi | G06F 3/016 |
| 2024/0103624 A1* | 3/2024 | Chen | H03K 17/9647 |

* cited by examiner

*Primary Examiner* — Afroza Chowdhury
(74) *Attorney, Agent, or Firm* — Wiersch Law Group

(57) ABSTRACT

Disclosed are a touch recognition method and system for a conjoined side button, and a related device. The conjoined side button includes at least two transducers corresponding to a button structure and at least one sensor arranged between the transducers. The touch recognition method includes: obtaining a main touch signal of the conjoined side button through a sensor; obtaining auxiliary touch signals of the conjoined side button through different transducers; performing threshold recognition on the main touch signal and the auxiliary touch signals obtained by the different transducers, to obtain touch recognition results; and determining preset touch events according to the touch recognition results, and generating corresponding touch data. The touch recognition method disclosed can reduce interference of different adjacent button structures in a solid-state conjoined button to touch recognition, and improve recognition accuracy of touch modes such as pressing and sliding of a solid-state conjoined button structure.

7 Claims, 4 Drawing Sheets

TOUCH RECOGNITION METHOD AND SYSTEM FOR CONJOINED SIDE BUTTON, AND RELATED DEVICE

CROSS REFERENCE TO RELATED APPLICATIONS

The present application a continuation of PCT Patent Application No. PCT/CN2023/143461 entitled "TOUCH RECOGNITION METHOD AND SYSTEM FOR CONJOINED SIDE BUTTON, AND RELATED DEVICE," filed Dec. 29, 2023, which is incorporated by reference herein in its entirety.

TECHNICAL FIELD

The present disclosure relates to the field of signal processing technologies, and in particular, to a touch recognition method and system for a conjoined side button, and a related device.

BACKGROUND

Piezoelectric ceramics are a kind of electronic ceramic materials with piezoelectric properties. Currently, a piezoelectric ceramic device is applied to components such as buttons of electronic products such as a mobile phone and a watch in the related art, to realize sensing and vibration functions, which has achieved good user experience and market response. A mainstream name of this solution is a solid-state button.

However, when this solution of the solid-state button in the related art is applied to a conjoined button (such as a volume increasing button and a volume decreasing button), only a single press vibration function can be realized, or recognition of an action of up and down sliding touch of the solid-state conjoined button is inaccurate, and a touch action of a user cannot be recognized in a timely and reliable manner. Such a technical solution limits application and promotion of the piezoelectric ceramic device.

Therefore, it is necessary to provide a new touch recognition method for a conjoined side button to resolve the foregoing problems.

SUMMARY

Embodiments of the present disclosure are intended to provide a touch recognition method and system for a conjoined side button, and a related device with higher touch behavior recognition accuracy.

According to a first aspect, embodiments of the present disclosure provide a touch recognition method for a conjoined side button. The conjoined side button includes at least two transducers corresponding to a button structure and at least one sensor arranged between two adjacent transducers. The touch recognition method includes:
  obtaining a main touch signal of the conjoined side button through the at least one sensor;
  obtaining auxiliary touch signals of the conjoined side button through different transducers;
  performing threshold recognition on the main touch signal and the auxiliary touch signals obtained by the different transducers, to obtain touch recognition results; and
  determining preset touch events that occur on the conjoined side button according to the touch recognition results, and generating corresponding touch data.

As an improvement, the preset touch events include sliding on the conjoined side button, and pressing the conjoined side button.

As an improvement, the touch recognition results include:
  if the main touch signal and the auxiliary touch signals obtained by the at least two transducers are all greater than a preset sliding recognition threshold, it is recognized that a sliding action is generated; and
  if the main touch signal and the auxiliary touch signal obtained by at least one transducer are both less than the preset sliding recognition threshold, it is recognized that a pressing action is generated.

As an improvement, the conjoined side button is a piezoelectric ceramic device.

As an improvement, each of the auxiliary touch signals is a piezoelectric signal collected by each of the at least two transducers through the piezoelectric ceramic device.

As an improvement, the at least one sensor is a pressure sensor or a proximity sensor.

As an improvement, the main touch signal is a pressure sensing signal collected by the at least one sensor.

According to a second aspect, embodiments of the present disclosure further provide a touch recognition system for a conjoined side button. The conjoined side button includes at least two transducers corresponding to a button structure and at least one sensor arranged between two adjacent transducers. The touch recognition system includes:
  a main signal collection module, configured to obtain a main touch signal of the conjoined side button through the at least one sensor;
  an auxiliary signal collection module, configured to obtain auxiliary touch signals of the conjoined side button through different transducers;
  a signal recognition module, configured to perform threshold recognition on the main touch signal and the auxiliary touch signals obtained by the different transducers, to obtain touch recognition results; and
  a data generation module, configured to determine preset touch events that occur on the conjoined side button according to the touch recognition results, and generate corresponding touch data.

According to a third aspect, embodiments of the present disclosure further provide a computer device, including: a memory, a processor, and a touch recognition program for a conjoined side button stored in the memory and executable by the processor. When the processor executes the touch recognition program for the conjoined side button, the operations of the touch recognition method for the conjoined side button according to any of the foregoing embodiments are implemented.

According to a fourth aspect, embodiments of the present disclosure further provide a computer-readable storage medium. The computer-readable storage medium stores a touch recognition program for a conjoined side button. When the touch recognition program for the conjoined side button, when executed by a processor, causes the processor to implement the operations of the touch recognition method for the conjoined side button according to any of the foregoing embodiments.

Compared with the related art, according to the touch recognition method for the conjoined side button provided in the embodiments of the present disclosure, the conjoined side button includes at least two transducers corresponding to a button structure and at least one sensor arranged between the transducers. The touch recognition method includes: obtaining a main touch signal of the conjoined side button through a sensor; obtaining auxiliary touch signals of the conjoined side button through different transducers; performing threshold recognition on the main touch signal and the auxiliary touch signals obtained by the different transducers, to obtain touch recognition results; and determining preset touch events that occur on the conjoined side button according to the touch recognition results, and generating corresponding touch data. In the foregoing method, the touch event is recognized through a specific signal collection unit arranged in the conjoined button in the embodiments of the present disclosure, which can reduce interference of different adjacent button structures in the solid-state conjoined button to touch recognition. In addition, according to the embodiments of the present disclosure, two sensing modes of pressure sensing and piezoelectric sensing are adopted to collect the touch signals, and recognition accuracy of touch modes such as pressing and sliding of a solid-state conjoined button structure is improved through collaborative processing of two types of signals.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

Technical solutions in embodiments of the present disclosure are clearly and completely described below with reference to accompanying drawings in the embodiments of the present disclosure. Apparently, the described embodiments are merely some rather than all of the embodiments of the present disclosure. All other embodiments obtained by a person of ordinary skill in the art based on the embodiments in the present disclosure without creative efforts shall fall within the protection scope of the present disclosure.

First Embodiment

Figure 1:
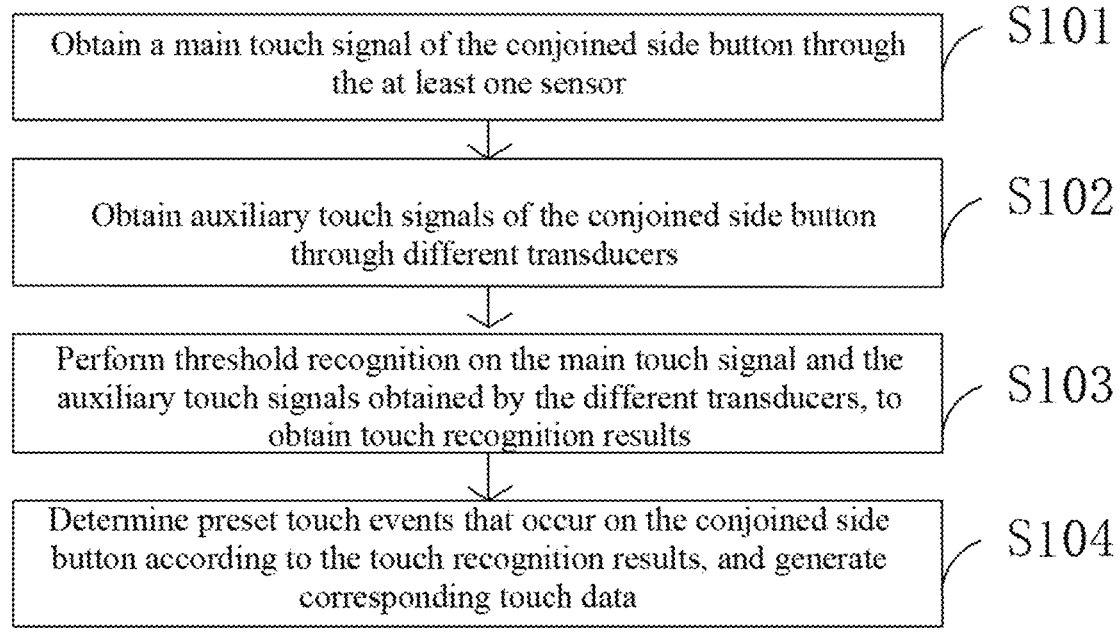
FIG. 1 is a flow chart of operations of a touch recognition method for a conjoined side button according to an embodiment of the present disclosure.
Figure 2:
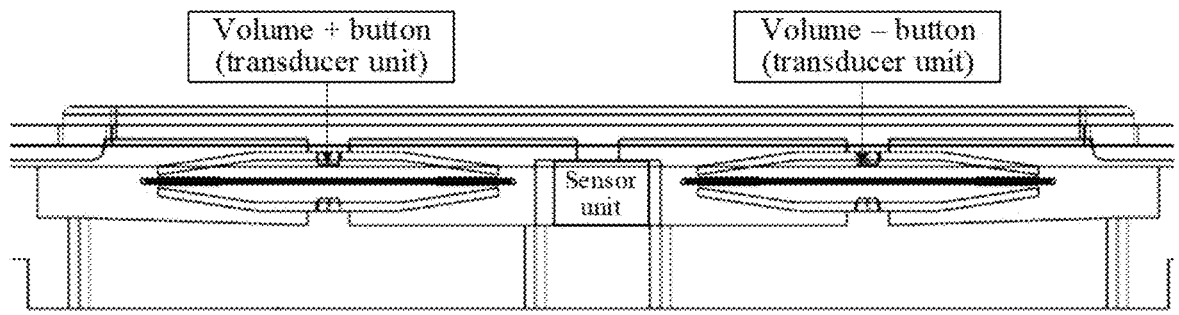
FIG. 2 is a schematic structural diagram of a conjoined side button according to an embodiment of the present disclosure.

Referring to FIG. 1, FIG. 1 is a flow chart of operations of a touch recognition method for a conjoined side button according to an embodiment of the present disclosure. Specifically, referring to FIG. 2, FIG. 2 is a schematic structural diagram of a conjoined side button according to an embodiment of the present disclosure. The conjoined side button includes at least two transducers corresponding to a button structure (a volume increasing button and a volume decreasing button) and at least one sensor arranged between the transducers. Unless otherwise specified, a case in which one conjoined side button has two button structures is used for description in this embodiment of the present disclosure. Two transducers are correspondingly arranged, and one sensor is arranged. The touch recognition method includes the following operations.

S101: a main touch signal of the conjoined side button is obtained through the sensor.

Specifically, in this embodiment of the present disclosure, the sensor and the transducers are designed to respectively collect touch signals. To distinguish between the touch signals, the signal collected by the sensor is the main touch signal, and the signals collected by the transducers are auxiliary touch signals.

The sensor is a pressure sensor or a proximity sensor. Such a sensor is a pressure sensing sensor. The sensor is arranged between different transducers. When the conjoined side button is touched to generate displacement, the sensor monitors an external change and generates a pressure sensing signal. To be specific, the main touch signal is the pressure sensing signal collected by the sensor. In another possible implementation, a plurality of sensors are arranged between different transducers, which may improve recognition accuracy of the main touch signal. This may be set based on the button structure and actual needs.

S102: auxiliary touch signals of the conjoined side button are obtained through different transducers.

In this embodiment of the present disclosure, the conjoined side button is a piezoelectric ceramic device. The piezoelectric ceramic device has good piezoelectric properties. The transducer is directly arranged in the conjoined side button. When the conjoined side button is touched, a piezoelectric signal is generated and directly collected by the transducer. To be specific, each of the auxiliary touch signals is a piezoelectric signal collected by the transducer through the piezoelectric ceramic device. During implementation, the transducer may be implemented through an arcuate transducer based on a shape of the button structure.

Since the conjoined side button has a plurality of button structures, a quantity of the transducers needs to be configured to correspond to a quantity of the button structures in the embodiments of the present disclosure. However, the signals collected by the different transducers may be separately distinguished, such as a first auxiliary touch signal and a second auxiliary touch signal, so as to implement expansion of a recognition function by analyzing generation and magnitudes of different signals.

S103: threshold recognition is performed on the main touch signal and the auxiliary touch signals obtained by the different transducers, to obtain touch recognition results.

The conjoined side button has the button function. However, with the continuous innovation of science and technology, a conjoined button made of a piezoelectric ceramic material may also generate different signals by sliding, thereby expanding functions of devices such as a watch and a mobile phone. In this embodiment of the present disclosure, touch recognition is performed based on specific thresholds of the main touch signal and the auxiliary touch signals obtained by the different transducers. The threshold may be processed before the recognition to facilitate comparison. Methods for generating piezoelectric data and pressure sensing data are different. Therefore, the piezoelectric data may be read directly by a data processing unit, and electrical signal conversion may need to be performed on the pressure sensing data through an analog to digital converter (ADC). A specific processing procedure may be designed based on actual needs.

The touch recognition results include:

if the main touch signal and the auxiliary touch signals obtained by the at least two transducers are all greater than a preset sliding recognition threshold, it is recognized that a sliding action is generated; and if the main touch signal and the auxiliary touch signal obtained by at least one transducer are both less than the preset sliding recognition threshold, it is recognized that a pressing action is generated.

In the related art, the pressing action may be determined based on a signal collected by a single transducer. However, a typical sliding action is to slide from one side of the button to the other on the conjoined side button. In this case, the method in the related art is no longer applicable, and the plurality of transducers provided in this embodiment of the present disclosure all collect the auxiliary touch signals, and may also collect a relatively small main touch signal under a specific condition. Since the sliding action is different from the pressing action, and the button structure is not pressed, generation of the sliding action may be clearly recognized through the preset sliding threshold designed in the embodiments of the present disclosure.

S104: preset touch events that occur on the conjoined side button are determined according to the touch recognition results, and corresponding touch data is generated.

The preset touch events include sliding on the conjoined side button, and pressing the conjoined side button.

The touch data in this embodiment of the present disclosure is relative to devices such as the watch and the mobile phone. The touch data may also be used as the recognition result. When the touch recognition method for the conjoined side button provided in the embodiments of the present disclosure is applied to a smart device, a processing unit of the smart device may recognize a corresponding touch event based on the touch data, and enable or implement a specific function.

It should be noted that, more touch actions may be designed for the conjoined side button based on the piezoelectric ceramic device based on a usage scenario, for example, touch actions such as sliding after pressing the button structure, slight sliding, and bidirectional sliding. Based on the touch recognition method for the conjoined side button provided in the embodiments of the present disclosure, different preset touch events may be set to correspond by using different signal collection units and based on an analysis process of the piezoelectric data and the pressure sensing data, which may further enrich the functions of the devices such as the watch and the mobile phone.

Compared with the related art, according to the touch recognition method for the conjoined side button provided in the present disclosure, the conjoined side button includes at least two transducers corresponding to a button structure and at least one sensor arranged between the transducers. The touch recognition method includes: obtaining a main touch signal of the conjoined side button through a sensor; obtaining auxiliary touch signals of the conjoined side button through different transducers; performing threshold recognition on the main touch signal and the auxiliary touch signals obtained by the different transducers, to obtain touch recognition results; and determining preset touch events that occur on the conjoined side button according to the touch recognition results, and generating corresponding touch data. In the foregoing method, the touch event is recognized through a specific signal collection unit arranged in the conjoined button in the embodiments of the present disclosure, which can reduce interference of different adjacent button structures in the solid-state conjoined button to touch recognition. In addition, according to the embodiments of the present disclosure, two sensing modes of pressure sensing and piezoelectric sensing are adopted to collect the touch signals, and recognition accuracy of touch modes such as pressing and sliding of a solid-state conjoined button structure is improved through collaborative processing of two types of signals.

Second Embodiment

Figure 3:
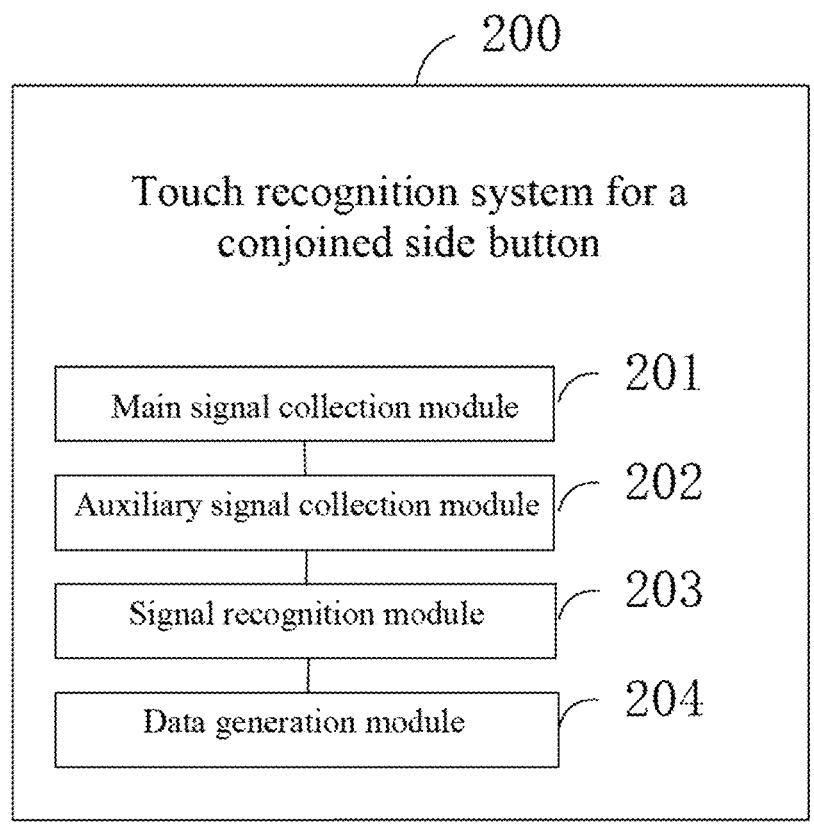
FIG. 3 is a schematic structural diagram of a touch recognition system for a conjoined side button according to an embodiment of the present disclosure.

Referring to FIG. 3, FIG. 3 is a schematic structural diagram of a touch recognition system for a conjoined side button according to an embodiment of the present disclosure. The conjoined side button includes at least two transducers corresponding to a button structure and at least one sensor arranged between the transducers. A touch recognition system 200 for a conjoined side button includes:

a main signal collection module 201, configured to obtain a main touch signal of the conjoined side button through the at least one sensor;

an auxiliary signal collection module 202, configured to obtain auxiliary touch signals of the conjoined side button through different transducers;

a signal recognition module 203, configured to perform threshold recognition on the main touch signal and the auxiliary touch signals obtained by the different transducers, to obtain touch recognition results; and a data generation module 204, configured to determine preset touch events that occur on the conjoined side button according to the touch recognition results, and generate corresponding touch data.

The touch recognition system 200 for the conjoined side button can implement the operations of the touch recognition method for the conjoined side button in the foregoing embodiments, and can achieve the same technical effect. Reference is made to the description in the foregoing embodiments, and details are not described herein again.

Third Embodiment

Figure 4:
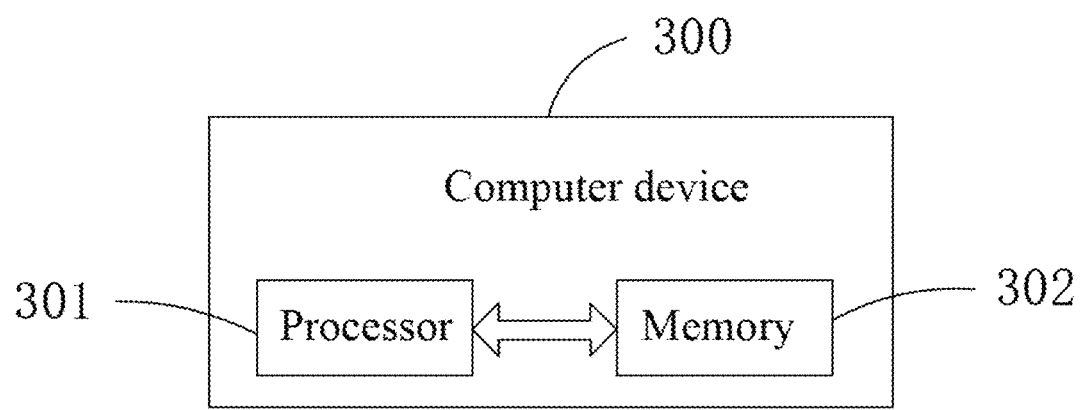
FIG. 4 is a schematic structural diagram of a computer device according to an embodiment of the present disclosure.

An embodiment of the present disclosure further provides a computer device. Referring to the figure, FIG. 4 is a schematic structural diagram of a computer device according to an embodiment of the present disclosure. The computer device 300 includes a memory 302, a processor 301, and a touch recognition program for a conjoined side button stored in the memory 302 and executable by the processor 301.

The processor 301 calls the touch recognition program for the conjoined side button stored in the memory 302 to perform the operations of the touch recognition method for the conjoined side button provided in the embodiments of the present disclosure. Referring to FIG. 1, the method specifically includes the following operations.

S101: a main touch signal of the conjoined side button is obtained through the sensor.

The sensor is a pressure sensor or a proximity sensor.

The main touch signal is a pressure sensing signal collected by the sensor.

S102: auxiliary touch signals of the conjoined side button are obtained through different transducers.

The conjoined side button is a piezoelectric ceramic device.

Each of the auxiliary touch signals is a piezoelectric signal collected by each of the transducers through the piezoelectric ceramic device.

S103: threshold recognition is performed on the main touch signal and the auxiliary touch signals obtained by the different transducers, to obtain touch recognition results.

The touch recognition results include:
- if the main touch signal and the auxiliary touch signals obtained by the at least two transducers are all greater than a preset sliding recognition threshold, it is recognized that a sliding action is generated; and
- if the main touch signal and the auxiliary touch signal obtained by at least one transducer are less than the preset sliding recognition threshold, it is recognized that a pressing action is generated.

S104: preset touch events that occur on the conjoined side button is determined according to the touch recognition results, and corresponding touch data is generated.

The preset touch events include sliding on the conjoined side button, and pressing the conjoined side button.

The computer device 300 provided in this embodiment of the present disclosure can implement the operations of the touch recognition method for the conjoined side button in the foregoing embodiments, and can achieve the same technical effect. Reference is made to the description in the foregoing embodiments, and details are not described herein again.

Fourth Embodiment

An embodiment of the present disclosure further provides a computer-readable storage medium. The computer-readable storage medium stores a touch recognition program for a conjoined side button. When the touch recognition program for the conjoined side button is executed by a processor, the processing and operations of the touch recognition method for the conjoined side button provided in the embodiments of the present disclosure are implemented, and the same technical effect can be achieved. To avoid repetition, details are not described herein again.

It should be noted that, a term "include", "comprise", or any other variant thereof herein is intended to encompass non-exclusive inclusion, so that a process, a method, an article, or an apparatus including a series of elements not only includes those elements, but also includes another element not listed explicitly, or includes intrinsic elements for the process, the method, the article, or the apparatus. Without any further limitation, an element defined by a phrase "include a . . . " does not exclude existence of an additional same element in the process, the method, the article, or the apparatus that includes the element.

According to the descriptions of the foregoing implementations, a person skilled in the art may clearly learn that the method in the foregoing embodiments may be implemented by software with a necessary universal hardware platform, or may certainly be implemented by hardware. However, in many cases, the software with the universal hardware platform is a preferred implementation. Based on such an understanding, the technical solution of the present disclosure may be embodied in the form of a computer software product in essence or in a part contributing to the prior art. The computer software product is stored in a storage medium (such as a ROM/RAM, a magnetic disk, or an optical disc) including several instructions to enable a terminal device (which may be a mobile phone, a computer, a server, an air conditioner, a network device, or the like) to perform the methods described in the embodiments of the present disclosure.

The above are merely implementations of the present disclosure. It should be noted herein that a person of ordinary skill in the art may further make improvements without departing from the inventive concept of the present disclosure, but the improvements shall fall within the protection scope of the present disclosure.

What is claimed is:

1. A touch recognition method for a conjoined side button, wherein the conjoined side button comprises at least two transducers corresponding to a button structure and at least one sensor arranged between two adjacent transducers, and the touch recognition method comprises:
   obtaining a main touch signal of a conjoined side button through the at least one sensor;
   obtaining auxiliary touch signals of the conjoined side button through different transducers;
   performing threshold recognition on the main touch signal and the auxiliary touch signals obtained by the different transducers, to obtain touch recognition results; and
   determining preset touch events that occur on the conjoined side button according to the touch recognition results, and generating corresponding touch data:
   wherein the preset touch events comprise:
   sliding on the conjoined side button; and
   pressing the conjoined side button.

2. The touch recognition method for the conjoined side button according to claim 1, wherein the touch recognition results comprise:
   it is recognized that a sliding action is generated in response to the main touch signal and the auxiliary touch signals obtained by the at least two transducer units being all greater than a preset sliding recognition threshold; and
   it is recognized that a pressing action is generated in response to the main touch signal and the auxiliary touch signal obtained by at least one transducer unit being less than the preset sliding recognition threshold.

3. The touch recognition method for the conjoined side button according to claim 1, wherein the conjoined side button is a piezoelectric ceramic device.

4. The touch recognition method for the conjoined side button according to claim 3, wherein each of the auxiliary touch signals is a piezoelectric signal collected by each of the transducers through the piezoelectric ceramic device.

5. The touch recognition method for the conjoined side button according to claim 1, wherein the sensor is a pressure sensor or a proximity sensor.

6. The touch recognition method for the conjoined side button according to claim 5, wherein the main touch signal is a pressure sensing signal collected by the sensor.

7. A computer device, comprising a memory, a processor, and a touch recognition program for a conjoined side button stored in the memory and executable by the processor, wherein when the processor executes the touch recognition program for the conjoined side button, the operations of the touch recognition method for the conjoined side button according to claim 1 are implemented.

* * * * *